US007065470B2

(12) United States Patent
Seel

(10) Patent No.: US 7,065,470 B2
(45) Date of Patent: Jun. 20, 2006

(54) PLUG-AND-SOCKET DEVICE COMPRISING AN INTEGRATED DIAGNOSTIC/EVALUATION CIRCUIT, DISPLAY AND SWITCHABLE TERMINATING RESISTORS

(75) Inventor: Wolfgang Seel, Herzogenaurach (DE)

(73) Assignee: Profichip GmbH, Herzogenaurach (DE)

( * ) Notice: Subject to any disclaimer, the term of this patent is extended or adjusted under 35 U.S.C. 154(b) by 168 days.

(21) Appl. No.: 10/467,667

(22) PCT Filed: Feb. 13, 2002

(86) PCT No.: PCT/EP02/01498

§ 371 (c)(1), (2), (4) Date: Aug. 11, 2003

(87) PCT Pub. No.: WO02/065593

PCT Pub. Date: Aug. 22, 2002

(65) Prior Publication Data

US 2004/0093183 A1 May 13, 2004

(30) Foreign Application Priority Data

Feb. 13, 2001 (DE) ................................ 101 07 085
Feb. 14, 2001 (DE) ................................ 101 07 100

(51) Int. Cl.
*G06F 3/02* (2006.01)

(52) U.S. Cl. ...................... 702/183; 702/168; 702/182; 702/188

(58) Field of Classification Search ............ 702/60–65, 702/84, 113, 116, 182, 183, 189, 150, 168; 439/215; 361/801; 307/147; 713/300
See application file for complete search history.

(56) References Cited

U.S. PATENT DOCUMENTS

| | | | | |
|---|---|---|---|---|
| 4,626,633 | A | 12/1986 | Ruehl | 379/27.08 |
| 5,761,052 | A * | 6/1998 | Wheeler-King et al. | 361/803 |
| 6,424,248 | B1 * | 7/2002 | Toms et al. | 340/3.51 |
| 6,518,574 | B1 * | 2/2003 | Castleman | 250/339.15 |
| 6,871,253 | B1 * | 3/2005 | Greeff et al. | 710/316 |
| 2002/0016568 | A1 * | 2/2002 | Lebel et al. | 604/131 |
| 2002/0170399 | A1 * | 11/2002 | Gass et al. | 83/62.1 |

FOREIGN PATENT DOCUMENTS

| | | |
|---|---|---|
| DE | 42 29 566 | 3/1994 |
| DE | 689 11 827 | 6/1994 |

(Continued)

*Primary Examiner*—Marc S. Hoff
*Assistant Examiner*—Felix Suarez
(74) *Attorney, Agent, or Firm*—Paul Vincent

(57) ABSTRACT

Plug and socket devices for measuring and diagnostic purposes are known in the art. The substantial disadvantage of said plug and socket devices is that they only furnish mechanical and electrical connections. For diagnostic purposes, an additional socket for connecting the corresponding diagnostic device must therefore be provided. According to the invention, in order to provide for automatic diagnosis when the plug and socket device is connected, the latter has insulation piercing connectors, screw terminals or spring terminals for connecting at least one cable. A printed circuit board, on which a diagnostic and evaluation circuit is located is provided in the housing of the plug and socket device, at least one switchable terminating resistor is provided and the plug and socket device has a display device that is connected to the diagnostic and evaluation circuit for automatic continuous display of evaluation results. The device is applicable in the domain of connecting devices for bus systems and networks in data systems and communications, as well as for computer and automated systems.

8 Claims, 4 Drawing Sheets

FOREIGN PATENT DOCUMENTS

| | | |
|---|---|---|
| DE | 295 11 592 | 11/1995 |
| DE | 196 06 505 | 8/1996 |
| DE | 198 53 511 | 6/2000 |
| EP | 0 293 197 | 11/1988 |
| EP | 0 362 943 | 4/1990 |
| GB | 2 351 853 | 1/2001 |
| JP | 0 5251 139 | 9/1993 |
| WO | WO 97 25806 | 7/1997 |
| WO | WO 98/56079 | 12/1998 |
| WO | WO 01/06603 | 1/2001 |

* cited by examiner

PLUG-AND-SOCKET DEVICE COMPRISING AN INTEGRATED DIAGNOSTIC/EVALUATION CIRCUIT, DISPLAY AND SWITCHABLE TERMINATING RESISTORS

This application is the national stage of PCT/EP02/01498 filed on 13 Feb. 2002 and claims Paris convention priority of DE 101 07 085.3 filed Feb. 13, 2001 as well as DE 101 07 100.0 filed Feb. 14, 2001.

BACKGROUND OF THE INVENTION

The invention primarily concerns a plug and socket device in accordance with the independent claim.

Interfaces for connecting measuring devices have been known for a long time. DE 196 06 505 A1 discloses e.g. a plug for coupling to a diagnostic connection box. The diagnostic connection box contains socket-like electrical contact members in an insulating body, which are connected to devices to be tested. The plug has several plug pins cooperating with contact members of the connection box, which are connected to the electrical measuring devices. The plug has an inner lower housing containing a number of second socket-like electrical contact members, which are connected to the electrical measuring devices. The plug pins are disposed in a module and are extended on the side opposite to the side cooperating with the connection box to engage in the second socket-like electrical contact members of the lower housing. Finally, means are provided to detachably fix the module at the corresponding end of the plug.

DE 295 11 592 U1 discloses a diagnostic device for SCSI interfaces to display the signals of all relevant lines. Through monitoring of the relevant signal lines and evaluation of the corresponding signals, the signals are displayed in real time, and to facilitate recognition of very fast signals, these are additionally stored and displayed. Different available adaptors make this device suitable for almost all computers using an SCSI interface.

DE 198 53 511 A1 discloses a method for status-oriented maintenance of power switches using a measuring and processing computer, which is connected, via a diagnostic plug, to the control of the power switch to be tested. The measuring and processing computer has interfaces for measuring means which are mounted to the power switch for testing purposes and is connected to a computer comprising a data storage and input and output devices. Archived status data of the power switch to be examined and a maintenance program are loaded by the computer into the measuring and processing computer. The measuring and processing computer controls and monitors the processing of the predetermined maintenance program and receives manually entered data, measured values of the measuring means and signals of the control supplied through the diagnostic plug. The measuring and processing computer furthermore makes evaluations through comparison with the loaded archived status data and supplies the measured values, and/or values derived therefrom by an evaluation routine, to the computer. They are stored as maintenance protocol and are archived as new status data, wherein the maintenance program is processed interactively through dialogue with the user on the input and output devices and the user obtains information about activities to be carried out and input requests.

DE 42 29 566 C2 discloses a method and a device for automatic recognition of a device in the form of an intermediate device, end device or the like connected via a plug-socket arrangement to a supply device. A data transmission device transmits device-specific data, which is stored on the plug and/or on the socket, to an evaluation unit via a data transmission device disposed on the plug and on the socket. The evaluation unit compares the received data with stored data to recognize the connection device, wherein the device-specific data is transmitted between the data transmission devices disposed on the plug and socket in a contact-free fashion.

International committees (ITU, ETSI) and telecommunication administrations have proposed various switchable testing and examination circuits for digital communication systems having digital connections up to the consumer devices which permit localization of defects in the telecommunications system. Generally, such systems can determine whether or not the defect is within or outside of the central switching system but not whether or not the customer connection cables or customer devices are defective. WO 97/25806 discloses a method and network termination device for the localization of defects using switchable test circuits in a digital communications for speech and data, wherein the test circuit is connected to the output of the network termination device. The network termination device has a detector, a controllable switch and a network-terminating resistor for detecting control signals issued by the central switching system. In the event of malfunction, the central switching system generates the testing command and measurement sequence in dependence on the test procedure chosen in order to determine whether or not the portion of the network extending to the customer is defective. In order to prevent manipulation, the network termination device is filled with a solid mould mass so that only the outside contacts are accessible.

U.S. Pat. No. 4,626,633A discloses a tester for a customer connection cable, which is introduced between the customer connection cable and customer device. A manually operated switch can introduce a light diode between the a and b lines of the customer connection cable to indicate the presence of and/or polarity of the signal and calling voltages.

The above discussion of prior art acknowledges conventional plug devices for measuring and diagnostic purposes, in defect locating devices for telecommunications disposed in the central switching system and in current/voltage testers which can be introduced into a customer connection cable. The essential disadvantage of the above-described plug devices is that the devices only produce a mechanical and electrical connection. For diagnostic purposes, an additional socket must be provided for connecting the corresponding diagnostic device. Such switchable test circuits in digital communication systems often allow the central switching system to determine whether or not the communication segment leading to the customer is defective. However problems thereby often occur, since the customer interface is not free of feedback and since switching elements are necessarily introduced between the circuit switch and the user terminals. As a result thereof a customer defect can block command communication or the diagnostics may indicate no defect despite the fact that a defect is present at the users terminals which is actually caused by the network termination device. Moreover a manually operated tester introduced into the customer connection cable only permits limited-function, on-site testing of the customer connection cable.

In contrast to the known plug devices, it is the underlying purpose of the present invention to design the device such that, upon connection, diagnosis occurs automatically.

SUMMARY OF THE INVENTION

This purpose is achieved in accordance with the independent claim by a plug and socket device having:

- at least one cable connection in the form of an insulation piercing connector, a screw terminal or a spring terminal for the connection of at least one cable,
- at least one connection for an electronic circuit,
- a circuit board disposed in the housing of the plug and socket device on which a diagnostic and evaluation circuit and at least one switchable terminating resistor are disposed,
- a controller communicating with the diagnostic and evaluation circuit, and
- a display means connected to the diagnostic and evaluation device for displaying the results of the evaluation,
- wherein the terminating resistor can be operated using a sliding switch or can be switched and/or adjusted by means of the diagnostic and evaluation circuit.

The inventive plug and socket device has the advantage that the connected electronic structural components or devices and the bus communication in a bus system can be continuously monitored in a surprisingly simple fashion. In case of disturbances, the error is displayed directly at the respective plug and socket device to ensure rapid elimination thereof. The cause of the disturbance itself can be directly read from the display means of the plug and socket device to enable rapid localization and elimination of the disturbance by largely untrained staff. Contact establishment during plugging may also be displayed so that such sources of disturbances can be eliminated in a reliable fashion. The additional effort for the diagnostic and evaluation circuit integrated in the plug and socket device is small and is compensated for by the effort otherwise required for a separate diagnostic device and diagnostic socket/plug. The switchability or adjustability by means of the diagnostic and evaluation device advantageously permits remote control, programmability and automated performance. These tasks can be facilitated by the controller of the diagnostic and evaluation device.

In accordance with a preferred embodiment, the diagnostic and evaluation circuit is preferably supplied with power via the cable and/or the connection and the display means is preferably a monitor or a touch screen, which can facilitate both display and input for the diagnostic and evaluation device.

Due to the external current supply, a battery or an accumulator is generally not required for proper operation of the plug and socket device. For particularly stringent requirements, a redundant power supply may be provided. With auxiliary current supply via either the cable or the connection, buffering is generally unnecessary even in the event of disturbances including power loss.

In a further development of the invention, the plug and socket device has an upper part and a lower part and the terminating resistor is disposed in the upper part of the plug and socket device and can be manually or electrically switched.

This further development of the invention is advantageous in that it can be adjusted to the characteristic impedance of the cable or a correspondingly adjusted termination in dependence on the application. The manual operation embodiment of the sliding switch (operational from both sides) is economical to manufacture and has high operational reliability when the switch can be arrested.

In accordance with a preferred embodiment, the plug and socket device preferable has a see-through cover for the insulation piercing connector, the screw terminal or the spring terminal for visual supervision of the connections. In a further improvement of the invention according to claim 5, the display device comprises at least one light diode disposed on the circuit board in the lower portion of the plug and socket device which has at least one associated light guide.

These improvements of the invention have the advantage that the light diode/light guide configuration provides for a bright, robust display suited for use in unprotected locations (with soiling). The lighting in combination with a see-through cover permits continuous optical checking of the plug and socket device.

In a preferred embodiment of the invention, the cable/s is/are connected in the lower part of the plug and socket device and a plug or a socket is provided, displaced by 90°, on the front side of the upper part of the plug and socket device for connection to the electronic structural component and a device socket or a device plug is provided at the opposite rear side for connection to a programming or diagnostic device with extended functions.

This embodiment of the invention is advantageous in that it facilitates unambiguous handling (plug on one side and socket on the opposite side or vice versa) and good visual recognition is ensured during operation. A programming or diagnostic device may be connected to the inventive plug and socket device without interrupting ongoing bus communication and operation.

In a preferred embodiment of the invention, the connection comprises mechanical plug encoding elements or encoding elements which are connected to the diagnostic and evaluation circuit, and encode themselves in accordance with the specifications of the type-specific structural component and/or application.

This design of the invention has the advantage that the connection of non-system conform structural components can be reliably prevented. In particular, when automatically engaging encoding elements (also referred to as self-encoding elements) are used, a high operational safety is achieved. Additionally, corresponding association between cables and leads, and the structural component can be examined and assured.

Further advantages and details can be extracted from the following description of a preferred embodiment of the invention with reference to the drawing.

DESCRIPTION OF THE PREFERRED EMBODIMENT

Figure 1:
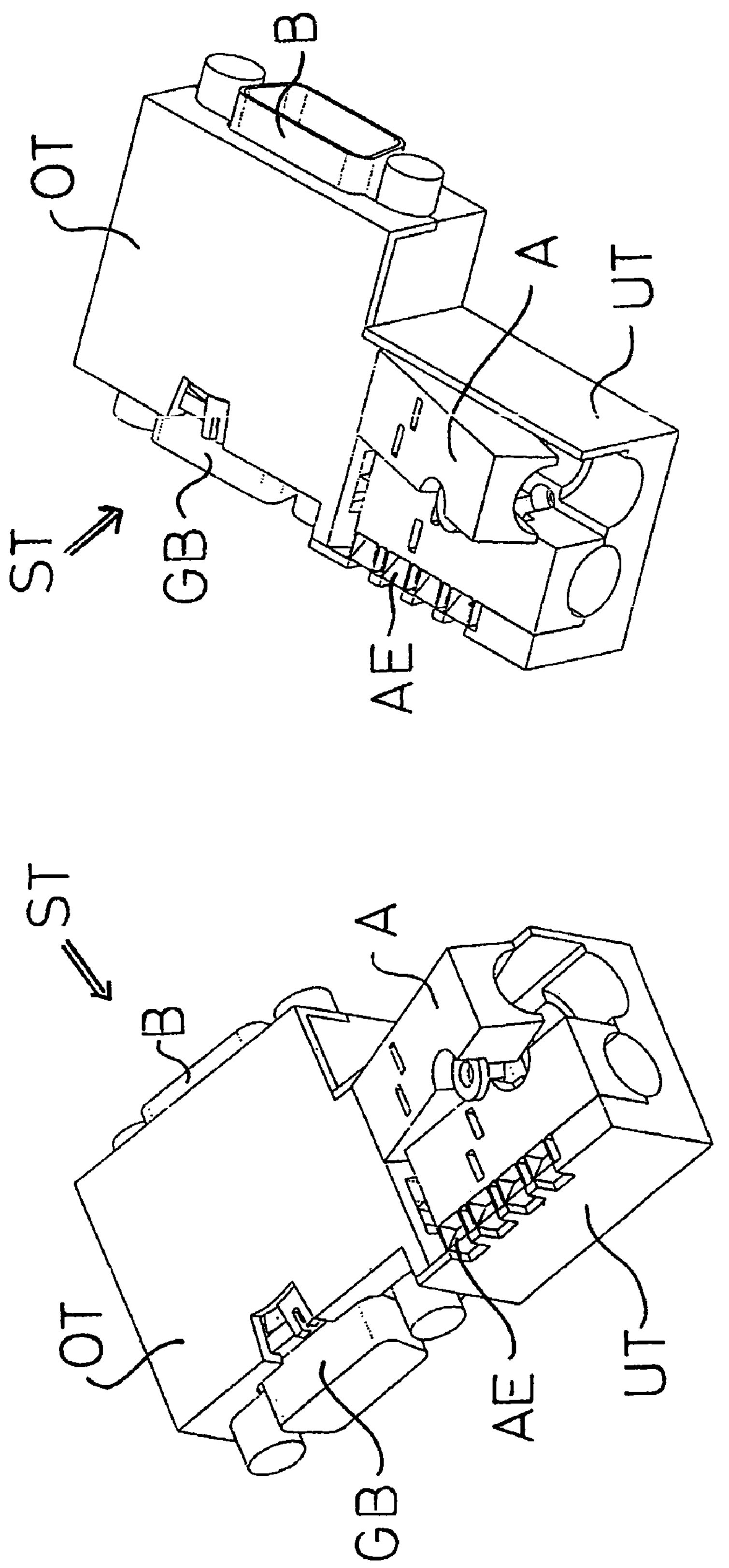
FIG. 1 shows a perspective side view of the plug housing.
Figure 2:
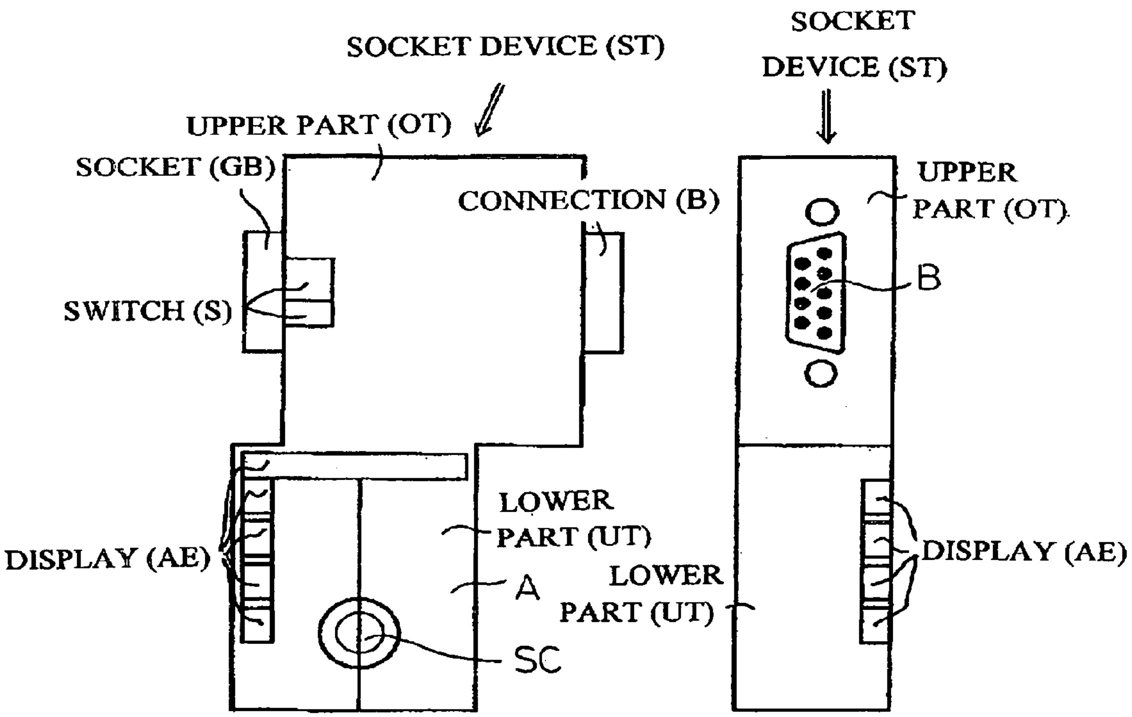
FIG. 2 shows two side views of the plug housing.
Figure 3:
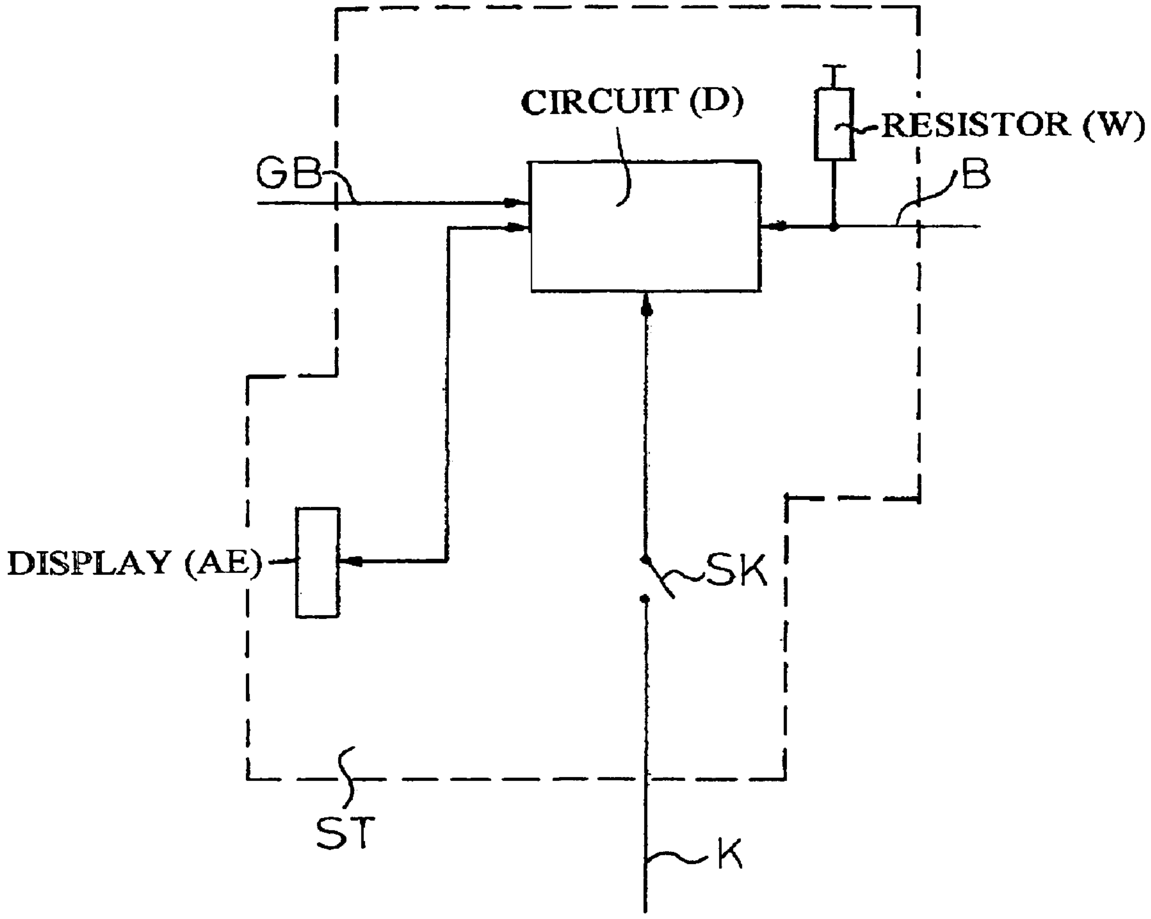
FIG. 3 shows a block diagram.
Figure 4:
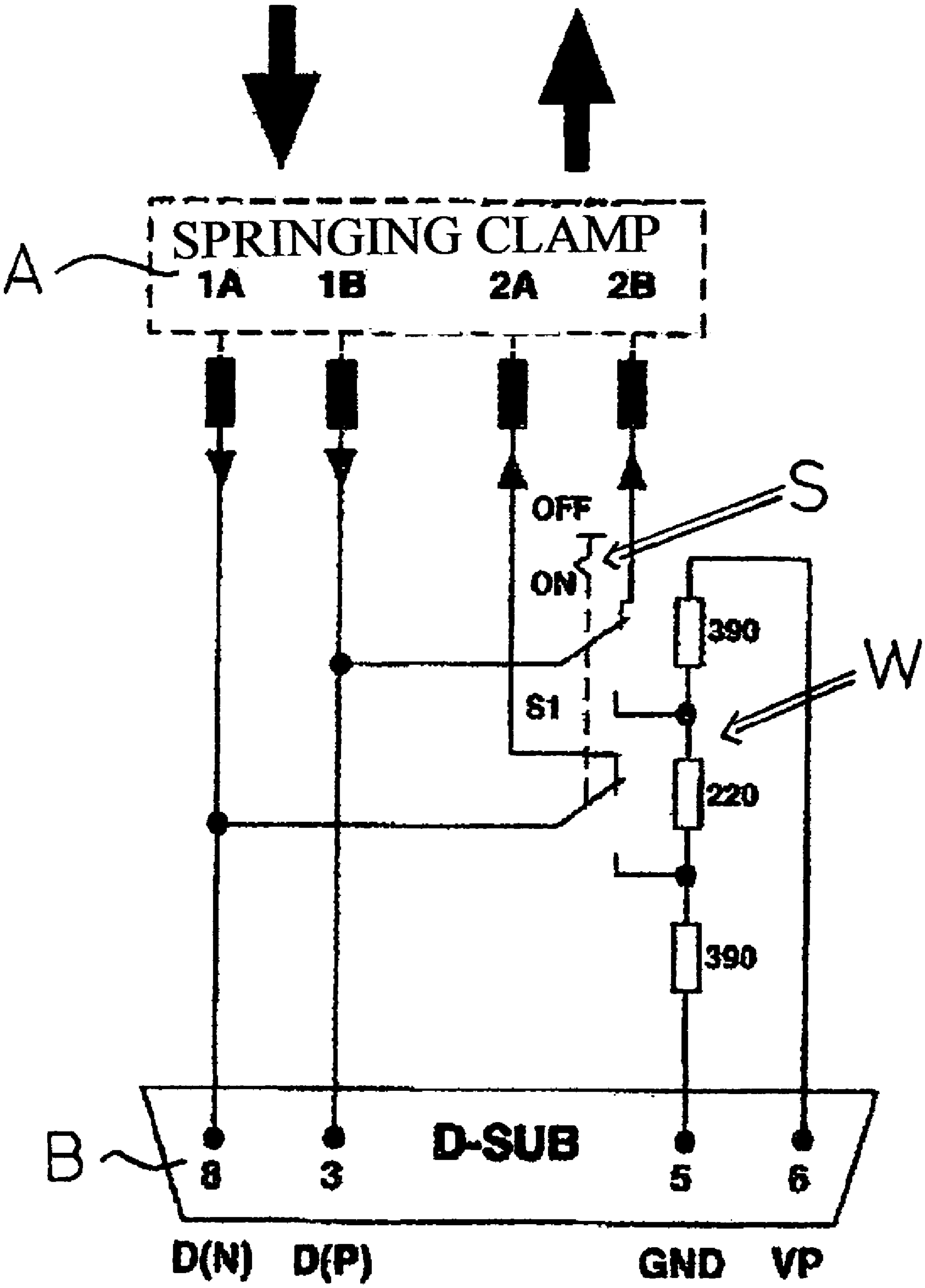
FIG. 4 shows the connection diagram of the inventive plug device.

FIGS. 1, 2, 3 and 4 show a preferred embodiment of the inventive plug and socket device ST for connection of two-core shielded field bus lines which passes a cable via a cable input and cable output (a 90° cable output is shown). The plug and socket device ST is designed such that it can be easily connected under field conditions, e.g. to a PROFIBUS bus line thereby permitting e.g. a transmission rate of between 9.6 Kbaud to 12 Mbaud. In principle, the inventive concept is suited for many applications, wherein the field of use extends from data networks and telecommunications technology to computer and automation systems (e.g. connection of a PC or laptop or operator terminal or visualization via a standard COM-/MPI interface).

The cable K is electrically connected via an insulation piercing connector, screw terminal or spring terminal connection A. In the embodiment shown in FIGS. 1 and 2, an insulation piercing technique is used in connection with a single-screw mounting system. Towards this end, the outer cable insulation is removed (e.g. up to 21 mm) from the shielding weave and the shielding weave is shortened by up to 8 mm. The screw-in mounting hole and screw are designated with S. A securing ring holds the screw in the open state such that all parts of the single-screw mounting system are prevented from being lost.

The mechanical clamping and guidance of the cable(s) K is effected via ribs with which the two cores of the respective cable K are fed to the insulation piercing connector A thereby ensuring precise and reliable penetration of the insulation. The ribs are preferably transparent for direct visible observation of proper seating and insulation piercing of the cable/s.

The plug and socket device ST has a lower and an upper part UT, OT wherein the connection of the cable(s) (K) is effected in the lower part UT. A plug B (alternatively a socket) is provided, offset by 90°, on the front side in the upper part OT of the plug and socket device ST for connecting to the device, and a device socket GB (alternatively a plug) is provided on the opposite rear side for connection to a programming or diagnostic device with extended functions.

The plug housing of the plug and socket device ST contains a printed circuit board having a diagnostic and evaluation circuit D disposed thereon. The control means (controller) of the diagnostic and evaluation circuit D operates e.g. up to a clock rate of 12 Mbaud. The diagnostic and evaluation circuit D is supplied with current via the cable K and/or the connection B. The intrinsic power consumption of the plug and socket device ST is thereby very small such that the bus member (device) is not unnecessarily loaded. Moreover, the plug housing or the printed circuit board has a switchable terminating resistor W. The terminating resistor W is preferably disposed in the upper part OT of the plug and socket device ST and can be manually operated by a slider switch S (see FIGS. 2 and 4 with the different resistances 390 ohms and 220 ohms. For a CAN bus system e.g. 120 ohms and transmission rate 10 kbits/s to 1 Mbit/s). Moreover, the terminating resistor W can be switched and/or adjusted by the diagnostic and evaluation circuit D (see FIG. 3). The slider switch S is in the switched-off position in FIG. 4 (OFF) such that line 1A is directly connected to line 2A and line 1B is directly connected to line 2B. When the slider switch S is brought into the switched position ON, a resistance of 220 ohms is introduced between the line contacts 1A and 2A and the connection between line 1B and line 2B is interrupted. When applied in a bus system, the OFF-position is selected when the structural component is disposed between neighboring structural components and the switched position ON is selected when the structural component is the last of the structural components disposed next to each other in a chain and the bus system is terminated. Via the slider switch S, which can also be designed as change-over switch accessible from both sides, one can adjust whether the plug and socket connection ST is to be used as a node or segment end in the communication system.

The plug and socket connection ST furthermore comprises a display means AE connected to the diagnostic and evaluation circuit D for displaying the results of the evaluation. The display means AE preferably comprises a light diode disposed on the printed circuit board in the lower part UT of the plug and socket device ST and at least one light guide associated with this light diode. These are thereby also visible from both sides (rear and front side) through the integrated light guides, which must be appropriately integrated when the ribs are transparent.

In the embodiment shown in the drawing and for application in a bus system with status display through 4 LEDs for bus testing functions, this display has e.g. the following meaning:

| | |
|---|---|
| First LED: green | = voltage supply for the structural component o.k. |
| Second LED: yellow | = structural component active on the bus (flashing) |
| Third LED: red | = no termination/terminating resistor (off) |
| | = termination/terminating resistor on (on) |
| | = wrong characteristic impedance (flashes slowly) |
| | = wrong terminating resistor (flashes quickly) |
| Fourth LED: yellow | = Baud rate (in connection with further LEDs) |

Moreover, the status display could also mean (LED flashes e.g. at 5 Hz):

| | |
|---|---|
| First LED: yellow | = no voltage supply (off) |
| | = Self-test carried out/voltage supply for controller/structural component/device o.k. (on) |
| | = Process data highway master failed/line short-circuit (flashes) |
| Second LED: green | = no bus activity (off) |
| | = structural component/device active on the bus (flashes) |
| Third LED: yellow | = no termination/terminating resistor (off) |
| | = termination/terminating resistor switched on (on) |
| | = termination/terminating resistor without voltage/defect (flashes) |
| Fourth LED: red | = Bus status o.k. (off) |
| | = No termination or open (on) |
| | = wrong voltage level (flashes) |

For shielding, the plug housing is made of metallic material, e.g. die cast zinc, wherein the shielding of the cable K is connected to the plug housing (skinning of the shield by 8 mm and direct contact). A further advantage is the electromechanical sturdiness.

Moreover, the connection B may have mechanical plug encoding elements or encoding elements which are connected to the diagnostic and evaluation circuit D and are self-encoding according to the specifications of the type-specific structural component and/or of the application to permit substantially automatic, unambiguous allocation.

Finally, at least one switch contact SK may be provided whose actuating element can be activated by the structural component or the cable K to be connected. This permits examination of devices to be connected and/or already connected and/or contact closure directly after plugging. Further switch contacts can be provided for introducing different supply voltages, the respective power supply, or the like. The actuating element can either have an axially displaceable or radially pivotable spring contact or several spring contacts. In a CAN bus system e.g. the bus connecting plug B is directly connected to the CAN bus interface (SUB-D socket, 9 pins) of the CAN bus member and the CAN bus line (at A) is connected via 6 pin screw terminals (for wires or flexible cores up to 1.0 $mm^2$).

In contrast to prior art, the inventive plug and socket device ST has no separate diagnostic device and no diagnostic socket/plug. The plug and socket device ST offers simple access to the "integrated test device/diagnostic socket" and installation of an additional network node is not required. In case of disturbances, the permanent optical display permits elimination thereof as well as permanent control of proper operation with surprisingly little effort.

All embodiments shown and described and all new individual features disclosed in the description and/or the drawing and their combinations are important to the invention. A display (in particular for displaying the Baud rate) or a contact-sensitive display may be provided instead of a display means AE with LED light guide combination, wherein the display serves for display and also to input commands to the diagnostic and evaluation circuit D. The contacts (cores and shielding) can be effected directly without skinning of the cable through the insulation piercing connector. For visual connection control (polarity, position of shield and cable), a clear cover can be provided for the insulation piercing connectors, screw terminals or spring terminals through which correct positioning of the bus line pairs is visible. All parts of the plug and socket device can be designed as a captured, single-screw mounting system. The plug and socket device can be provided with an axial cable output (instead of the 90° cable output, see B) and/or the display means may be arranged at that location etc.

I claim:

1. A plug and socket device comprising:

a housing;

at least one first connector mounted to said housing and structured as one of an insulation piercing connector, a screw terminal, and a spring terminal, said first connector for connection of at least one cable;

at least one second connector mounted to said housing for connection to an electronic component;

a circuit board disposed in said housing, said circuit board having a diagnostic and evaluation circuit and at least one switchable terminating resistor;

a controller communicating with said diagnostic and evaluation circuit; and a display means mounted on said housing and connected to said diagnostic and evaluation device for displaying evaluation results, wherein said terminating resistor can be switched and/or adjusted using one of a sliding switch and said diagnostic and evaluation circuit, wherein said second connector comprises encoding elements which are connected to said diagnostic and evaluation circuit which are self-encoding in accordance with specifications of a type-specific of the electronic component and/or In dependence on an application, said encoding elements having mechanical plug encoding elements.

2. The plug and socket device of claim 1, wherein said diagnostic and evaluation circuit is supplied with power via at least one of the cable and said second connector, wherein said display means comprises one of a monitor and a touch screen for display and input of said diagnostic and evaluation device.

3. The plug and socket device of claim 1, wherein said housing comprises a see-through cover for visual supervision of said first connector.

4. The plug and socket device of claim 1, wherein said first connector comprises transparent ribs for mechanical clamping and guidance of the cable, wherein said housing is produced from shielding metallic material and shielding of the cable is connected to said housing.

5. A plug and socket device comprising:

a housing;

at least one first connector mounted to said housing and structured as one of an insulation piercing connector, a screw terminal, and a spring terminal, said first connector for connection of at least one cable;

at least one second connector mounted to said housing for connection to an electronic component;

a circuit board disposed in said housing, said circuit board having a diagnostic and evaluation circuit and at least one switchable terminating resistor;

a controller communicating with said diagnostic and evaluation circuit; and a display means mounted on said housing and connected to said diagnostic and evaluation device for displaying evaluation results, wherein said terminating resistor can be switched and/or adjusted using one of a sliding switch and said diagnostic and evaluation circuit, wherein said housing comprises an upper part and a lower part, with said terminating resistor being disposed In said upper part for at least one of manual and electrical switching thereof.

6. The plug and socket device of claim 5, wherein said display means comprises at least one light diode disposed in said lower part of said housing on said circuit board and at least one light guide associated with said light diode.

7. The plug and socket device of claim 5, wherein the cable is connected to said lower part of said housing and said second connector comprises a socket disposed offset by 90° on a front side of said upper part of said housing for connection to the electronic component and further comprising a device socket disposed on an opposite rear side of said upper part for connecting a programming or diagnostic device with extended functions.

8. A plug and socket device comprising:

a housing;

at least one first connector mounted to said housing and structured as one of an insulation piercing connector, a screw terminal, and a spring terminal, said first connector for connection of at least one cable;

at least one second connector mounted to said housing for connection to an electronic component;

a circuit board disposed in said housing, said circuit board having a diagnostic and evaluation circuit and at least one switchable terminating resistor;

a controller communicating with said diagnostic and evaluation circuit; and a display means mounted on said housing and connected to said diagnostic and evaluation device for displaying evaluation results, wherein said terminating resistor can be switched and/or adjusted using one of a sliding switch and said diagnostic and evaluation circuit, wherein a status of bus test functions is displayed on said display means, and at least one switching contact is provided having an active element which can be actuated by the connected electronic component or by the cable, said active element having at least one axially displaceable or radially pivotable spring contact.

* * * * *